(12) United States Patent
Encinosa et al.

(10) Patent No.: US 9,511,520 B1
(45) Date of Patent: Dec. 6, 2016

(54) METHOD, APPARATUS AND DEVICE FOR PREVENTING VACUUM BAG WRINKLING

(71) Applicant: The Boeing Company, Chicago, IL (US)

(72) Inventors: Jose L. Encinosa, Lake Forest Park, WA (US); Garrett C. Hanson, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 262 days.

(21) Appl. No.: 14/463,753

(22) Filed: Aug. 20, 2014

(51) Int. Cl.
    *B29C 70/54* (2006.01)
    *B29C 70/44* (2006.01)
    *B29C 33/38* (2006.01)
    *B29C 43/20* (2006.01)

(52) U.S. Cl.
    CPC .......... *B29C 43/203* (2013.01); *B29C 33/38* (2013.01); *B29C 70/44* (2013.01); *B29C 70/54* (2013.01)

(58) Field of Classification Search
    CPC .... B29C 70/54; B29C 70/44; B29C 2033/385; B29C 33/38; B29C 43/203
    See application file for complete search history.

(56) References Cited

U.S. PATENT DOCUMENTS

| | | | | |
|---|---|---|---|---|
| 3,492,392 A | * | 1/1970 | Akabane | B29C 33/68 156/247 |
| 4,822,436 A | * | 4/1989 | Callis | B29C 43/3642 156/211 |
| 4,963,215 A | * | 10/1990 | Ayers | B29C 70/345 156/286 |
| 5,015,168 A | * | 5/1991 | Boime | B29C 70/42 264/552 |
| 5,538,589 A | | 7/1996 | Jensen et al. | |
| 5,641,525 A | * | 6/1997 | Yakel | B29C 33/3857 264/313 |
| 6,197,146 B1 | * | 3/2001 | Sucic | B29C 43/184 156/245 |
| 7,270,722 B2 | | 9/2007 | Navas et al. | |
| 7,464,508 B2 | | 12/2008 | Fournie et al. | |
| 8,303,757 B2 | * | 11/2012 | Glain | B29C 70/56 156/161 |
| 2011/0127698 A1 | * | 6/2011 | Alenby | B29C 70/54 264/510 |
| 2012/0204741 A1 | * | 8/2012 | Bremmer | B29C 70/44 100/102 |
| 2013/0048212 A1 | | 2/2013 | Louie et al. | |

OTHER PUBLICATIONS

Hansen, "Fabrication of Stiffened Composite Parts," U.S. Appl. No. 13/758,505, filed Feb. 4, 2013, 59 pages.

* cited by examiner

*Primary Examiner* — Robert B Davis
(74) *Attorney, Agent, or Firm* — Yee & Associates, P.C.

(57) ABSTRACT

A substantially rigid batten is attached to an external face of a vacuum bag to reduce wrinkling of the bag during vacuum bag compaction of a composite laminate layup.

19 Claims, 10 Drawing Sheets

METHOD, APPARATUS AND DEVICE FOR PREVENTING VACUUM BAG WRINKLING

BACKGROUND INFORMATION

1. Field

The present disclosure generally relates to vacuum bag processing of composite laminate, and deals more particularly with a method, apparatus and device for preventing wrinkling of vacuum bags during compaction of the laminate.

2. Background

Vacuum bags are commonly employed to compact uncured composite laminate layups in order to eliminate air, volatiles and excess resin from the layup. As the bag is evacuated, atmospheric pressure is applied to the layup, causing compaction and shrinkage of the layup. During this compaction process, the bag may deform in some areas, causing wrinkles to form in the bag. The applied compaction force may press the bag wrinkles against the surface of the layup, resulting in indentations referred to as "mark-off".

Mark-off may be undesired in several composite laminate applications, either for aesthetic reasons or because mark-off reduces the performance of the laminate. For example, the presence of mark-off in composite laminate stiffeners may have an undesirable effect on the structural qualities of the stiffener.

Accordingly, there is a need for a method and apparatus for reducing or eliminating wrinkling of vacuum bags during the compaction of composite laminates. There is also a need for a method and apparatus of the type mentioned above which reduces or eliminates mark-off on the surface of a laminate that is compacted using vacuum bag processing.

SUMMARY

The disclosed embodiments provide a method and apparatus that reduces or eliminate wrinkling of vacuum bags used to compact composite laminate structures. The apparatus is simple in construction, easy to install and may be used with existing tools with minor or no modifications. The disclosed embodiments may reduce the need for hard tooling in order to reduce mark-off on features of the laminate.

According to one disclosed embodiment, a method is provided of vacuum bag processing a composite laminate structure. A vacuum bag is placed over the composite laminate structure and a substantially rigid batten is attached to an outer face of the bag over a portion of the structure. The composite laminate structure is compacted by evacuating the vacuum bag. The batten may be attached by placing an adhesive layer between the batten and the outer face of the bag. The attachment may be carried out by placing a layer of double-sided adhesive tape between the batten and the outer face of the bag. The method may further comprise installing the batten on a tool, and the batten may be attached to the bag bringing the tool into contact with the outer face of the bag. Installing the batten on the tool includes indexing the batten on the tool to a location aligned with a feature of the composite laminate structure. The batten may be held against the tool using a suction force.

According to another disclosed embodiment, a method is provided of reducing wrinkling of a vacuum bag during vacuum bag compaction of a composite laminate structure. A generally rigid batten is attached to an external face of the vacuum bag at a location on the vacuum bag covering a feature of the composite laminate structure. Attachment of the bag may be performed by applying an adhesive layer between the external face of the vacuum bag and one side of the batten. The attachment process may include aligning the batten with a feature of the composite laminate structure. The batten may be installed on a tool, and the batten may be attached to the bag by bringing the tool into contact with the vacuum bag. The adhesive layer may be placed on the batten before the tool is brought into contact with the vacuum bag.

According to still further embodiment, a method is provided of fabricating a composite laminate structure. The method comprises assembling a composite laminate layup, and installing a vacuum bag over the composite laminate layup. A batten is attached on an external face of the bag covering a feature of the composite layup, and the bag is evacuated. The batten is used to substantially prevent wrinkling of the vacuum bag covering the feature. The composite layup is then cured. The batten may be attached by adhering it in face-to-face contact with the external face of the vacuum bag. The attachment process may include installing the batten on a tool, and bringing the tool into contact with the vacuum bag.

According to still another embodiment, apparatus is provided for curing a composite laminate structure. The apparatus includes at least one tool, a vacuum bag and at least one substantially rigid batten. The tool is capable of having a composite laminate layup placed thereagainst, and includes at least one pocket therein facing a feature of the composite laminate layup. The vacuum bag is sealed over the composite laminate layup. The substantially rigid batten is capable of being received within the pocket and engaging an external face of the vacuum bag. The tool includes an indexing device for indexing the batten in a preselected positioned within the pocket. The tool may also include a wall within the pocket against which the batten may be held, and a plurality of perforations in the wall adapted to be coupled with a vacuum for creating a suction force holding the batten against the wall. The batten may be a cured, multi-ply composite laminate having a face substantially matching the feature of the composite laminate layup.

According to a further disclosed embodiment, a device is provided for reducing wrinkling of a vacuum bag during vacuum bag compaction of a composite laminate. The device includes a substantially rigid batten having a geometry substantially matching a feature of the composite laminate, and an adhesive layer attaching the batten to the vacuum bag. The adhesive layer may include a layer of double-sided adhesive tape covering one side of the batten.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
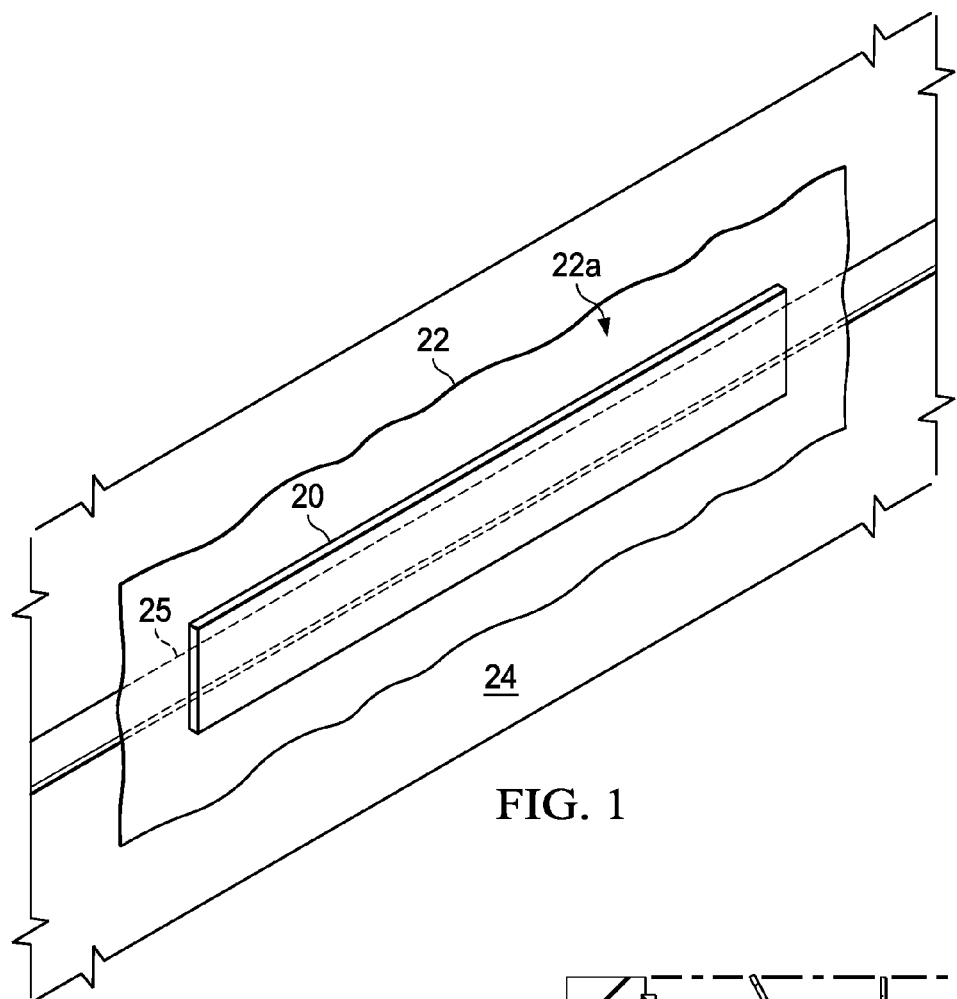
FIG. 1 is an illustration of a perspective view of a batten installed on a vacuum bag used to compact a composite laminate structure.

Referring first to FIG. 1-4, a device in the form of a substantially rigid batten 20 is externally attached on the outside face 22a of a flexible vacuum bag used to vacuum bag compact a composite laminate structure 24 during curing, bonding or other operations requiring compaction of the composite laminate structure 24. The batten 20 may be employed during autoclave or out-of-autoclave processing of composite laminate structure 24. The batten 20 is attached to the vacuum bag 22 in an area of the vacuum bag 22 that overlies one or more features 25 of the composite laminate structure 24. In the illustrated example, the batten 20 is substantially flat, however as will be discussed later in more detail, the batten 20 may have other geometries configured to substantially match the geometry of features 25 of the composite laminate structure 24.

The batten 20 has a degree of rigidity suitable for the application, and may vary depending upon the geometry of the features 25, compaction pressures, bag material and other variables that depend on the application. In one embodiment, the batten 20 may comprise a pre-cured multi-ply composite laminate such as a CRFP (carbon reinforced fiber plastic). In other embodiments, the batten 20 may be formed of other materials reinforced with wire or fiberglass mesh.

Figure 2:
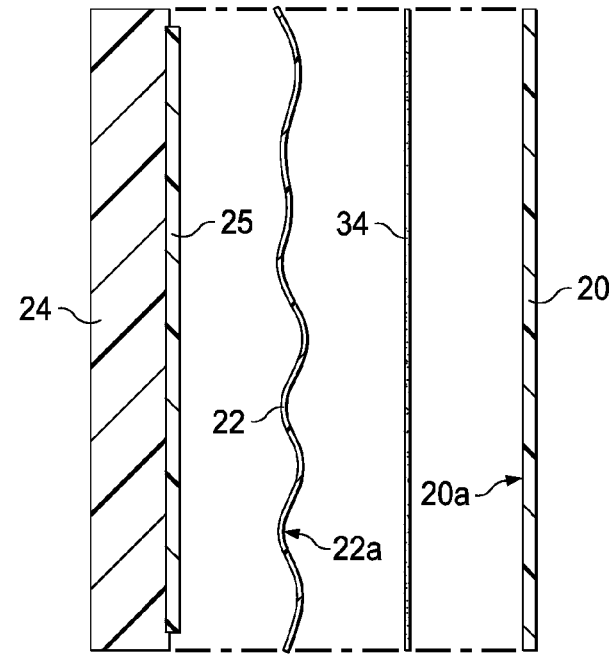
FIG. 2 is an illustration of a cross-sectional, exploded view showing external application of the batten to a portion of a vacuum bag.
Figure 3:
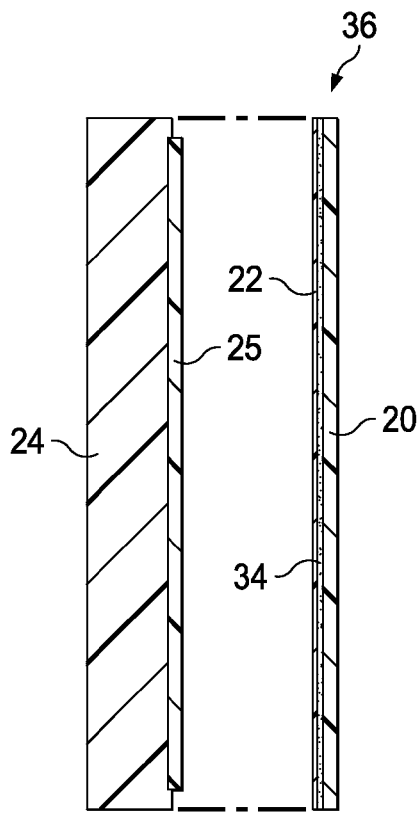
FIG. 3 is an illustration similar to FIG. 2, but showing the batten having been applied to the bag.
Figure 4:
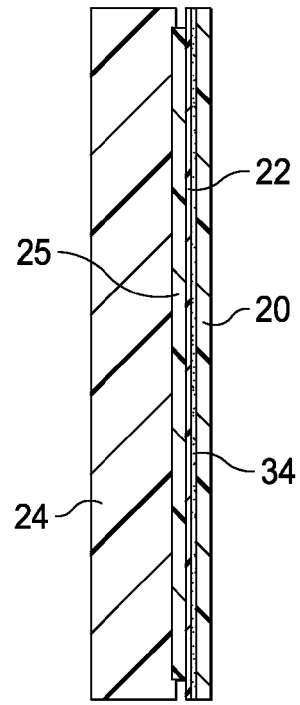
FIG. 4 is an illustration similar to FIG. 3 but showing the bag and the batten drawn down against the surface of the composite laminate structure during the compaction process.

As shown in FIGS. 2, 3 and 4 an adhesive layer 34 may be used to attach to the vacuum bag 22. In one embodiment, the adhesive layer 34 is applied to the batten 20 which is then placed on and adhered to the vacuum bag 22. However in other embodiments, it may be possible to apply the adhesive layer 34 to the vacuum bag 22, and then place the batten 20 on the adhesive layer 34. In one embodiment, the adhesive layer 34 may comprise a layer of double-sided adhesive tape. Generally, the adhesive layer 34 is coextensive with the inside face 20a of the batten 20 such that the entire area of the inside batten face 20a is adhered to the vacuum bag 22.

Figure 5:
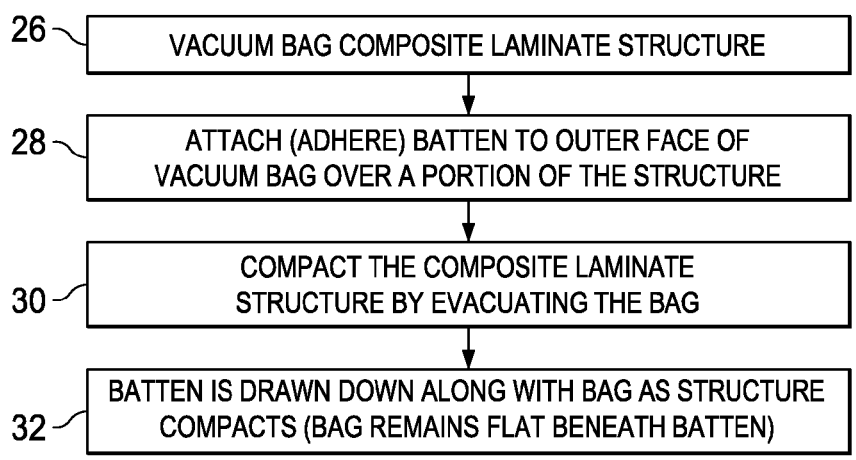
FIG. 5 is an illustration of a flow diagram of a method of reducing or eliminating wrinkling of a vacuum bag during vacuum bag processing of a composite laminate structure.

FIG. 5 broadly illustrates the overall steps of a method of vacuum bag compaction of a composite laminate structure 24 that reduces or eliminates localized wrinkling of the bag 22 during the compaction process. Beginning at 26, a vacuum bag 22 is placed over the composite laminate structure 24 and is sealed to a tool (not shown) or other structure, forming a vacuum chamber around the structure 24. At 28, a generally rigid batten 20 is attached by adhering it to the outer face 22a of the vacuum bag 22 over a portion of the structure containing one or more features 25. At step 30 the composite laminate structure 24 is compacted by evacuating the vacuum bag 22. At 32, the applied compaction force causes the composite laminate structure 24 to compact and shrink in volume.

As the composite laminate structure 24 shrinks in volume, the vacuum bag 22 deforms, creating excess bag material that may wrinkle in some areas of the vacuum bag 22. As the composite laminate structure 24 shrinks in volume, the batten 20 is drawn down along with the vacuum bag 22, but the adherence of the vacuum bag 22 to and throughout the inside face 20a (FIG. 2) of the batten prevents deformation and related wrinkling of the vacuum bag in the area covering the feature 25, thereby preventing mark-off on the feature 25.

The use of a generally rigid batten 20 applied to a vacuum bag 22 may be employed in a wide range of composite laminate manufacturing processes to prevent mark-off caused by bag wrinkling. For example, referring now to FIG. 6, the disclosed batten 20 may be employed in combination with a set of tools 44 to compact and cure a composite laminate structure 24 which in the illustrated example, comprises a blade type stringer 48. The stringer 48 may comprise a preformed multi-ply prepreg charge that is located and held located between the tools 44, and vacuum bagged for compaction and curing.

The stringer 48 comprises a pair of generally L-shaped members assembled together in the tools 44. Each of the L-shaped members includes an outwardly turned flange portion 54 and a web portion 56. The two L-shaped members form a stringer base 50, and a web or blade 52 which are supported and located by the tools 44. A caul plate 58 is placed over the stringer base 50 in order to apply a more even compaction pressure to the flanges 54, and a vacuum bag assembly 45 is installed around the stringer 48 and the caul plate 58. The vacuum bag assembly 45 comprises a release film 40 such as FEP overlying the charge, covered by a breather 38 and the vacuum bag 22. The vacuum bag 22 is sealed to the tools by any suitable means such as sealant tape 42. The tools 44 may have open interiors and include longitudinally extending recesses or pockets 46 therein which respectively face the stringer web 52. Each of the pockets 46 is configured to receive and hold one of the battens 20 therein.

Figure 6:
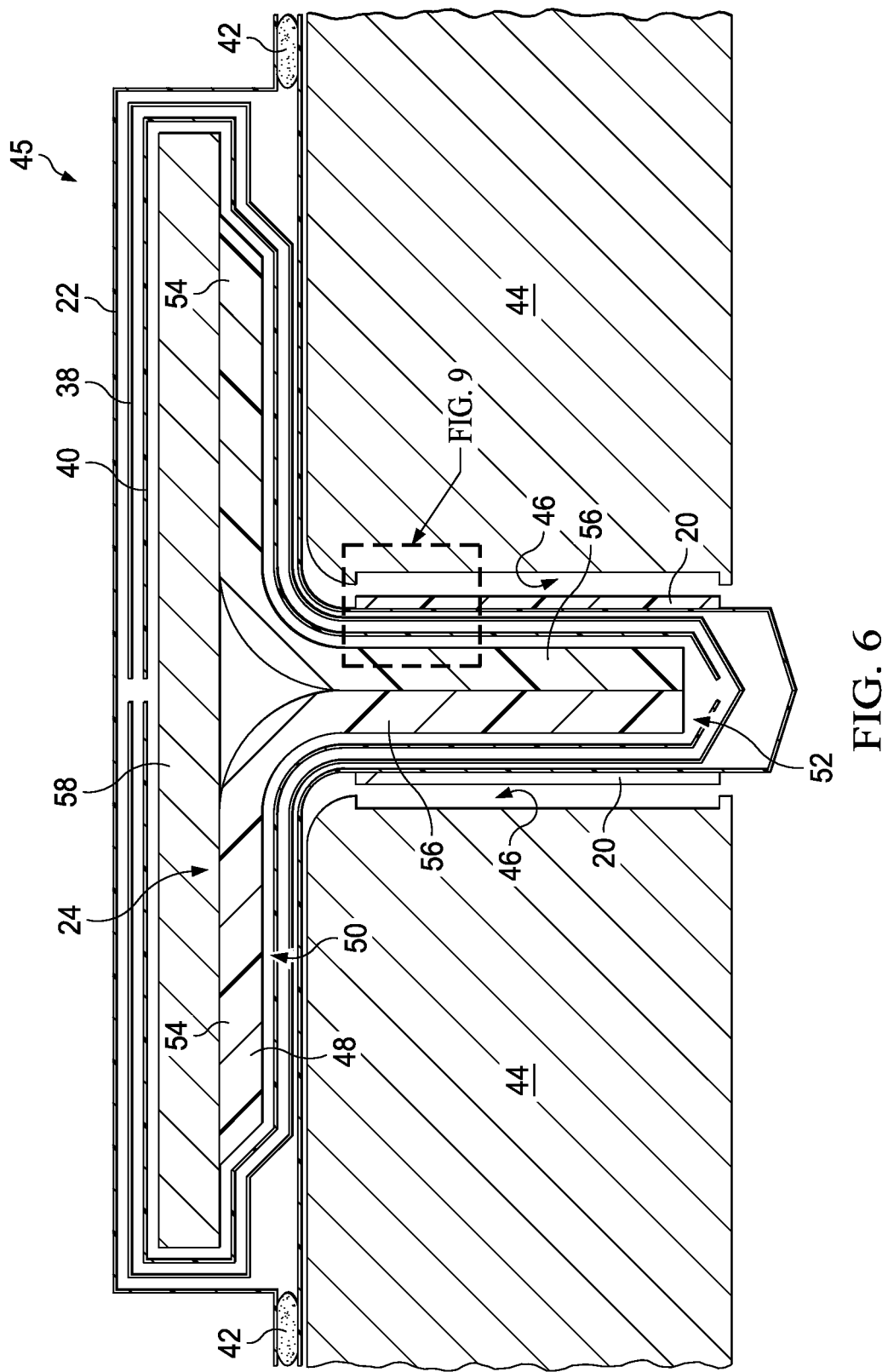
FIG. 6 is an illustration of a cross-sectional view of a vacuum bagged stringer charge installed in a set of tools, parts of the vacuum bag assembly exploded to better show the individual layers of the assembly.
Figure 7:
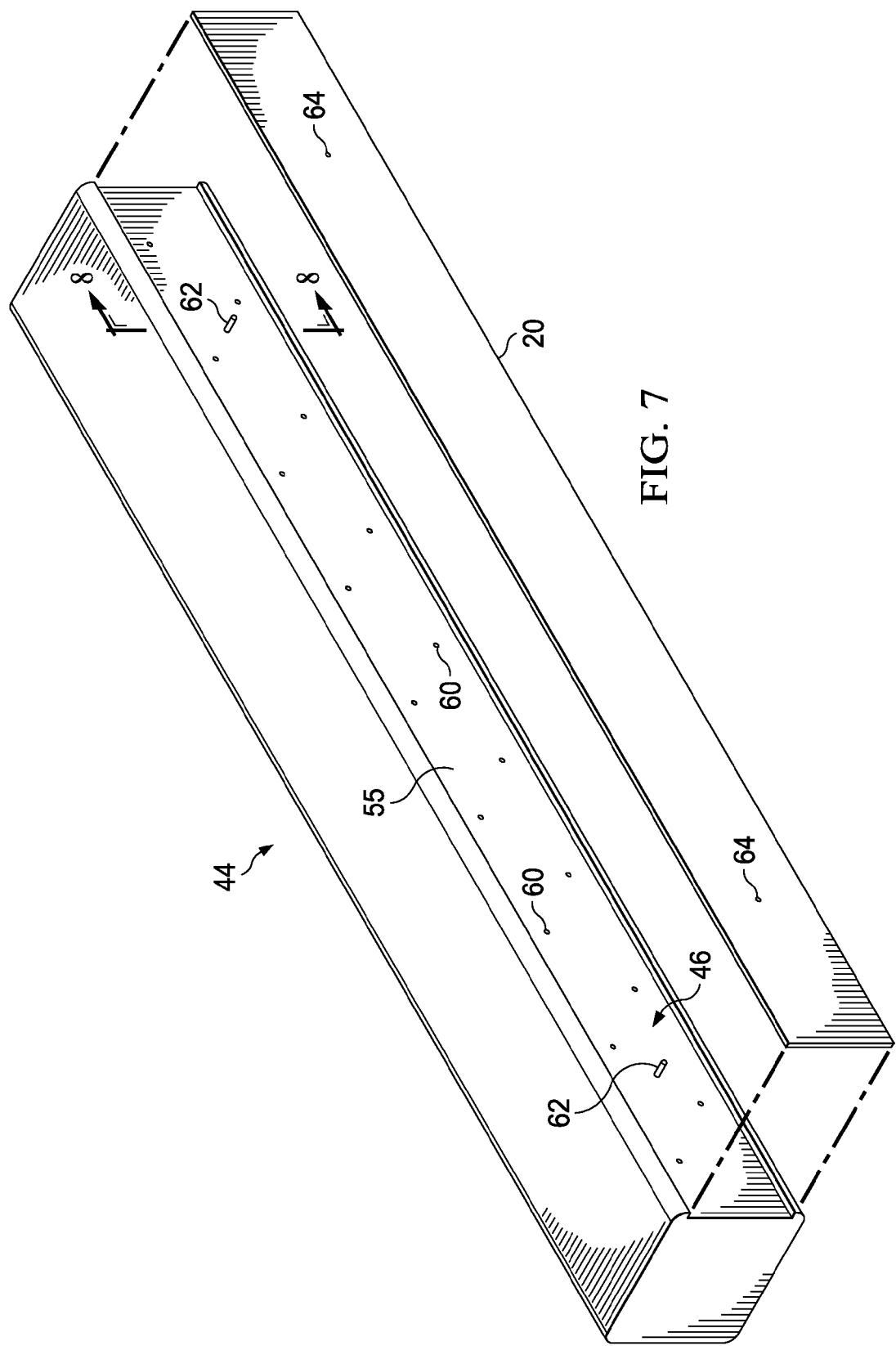
FIG. 7 is an illustration of an exploded, perspective view of one of the tools and one of batten shown in FIG. 6.
Figure 8:
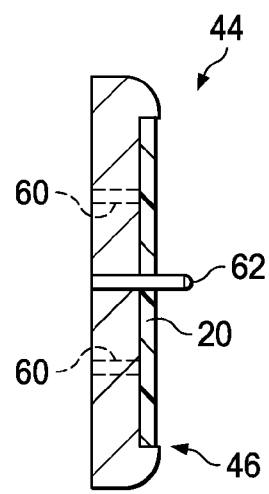
FIG. 8 is an illustration of a cross-sectional view taken along the line 8-8 in FIG. 7, but showing the batten installed in a pocket in the tool.

Attention is now directed to FIGS. 7-10 which illustrate additional details of the tools 44, and the battens 20 used in compacting and curing the stringer 48 shown in FIG. 6. The pockets 46 in the tools 44 may extend substantially the entire length of the stringer 48 and include an interior wall 55 against which the batten 20 is held while the tools 44 are being assembled around the stringer 48. The interior wall 55 includes a plurality of perforations 60 therein which are adapted to be coupled with a vacuum source (not shown).

The vacuum source is adapted to draw air in through the perforations 66, creating a suction or vacuum force on the interior wall 55 which holds the battens 20 within the pockets 46. Each of the tools 44 may include one or more indexing pins 62 or similar indexing devices or features that locate the battens 20 in any desired preselected position on the tools 44. Indexing of the battens 20 on the tools 44 in turn allows the battens 20 to be indexed relative to features on the composite laminate, such as the web portions 56 which form the web 82 of the stringer 48 (FIG. 6).

Figure 9:
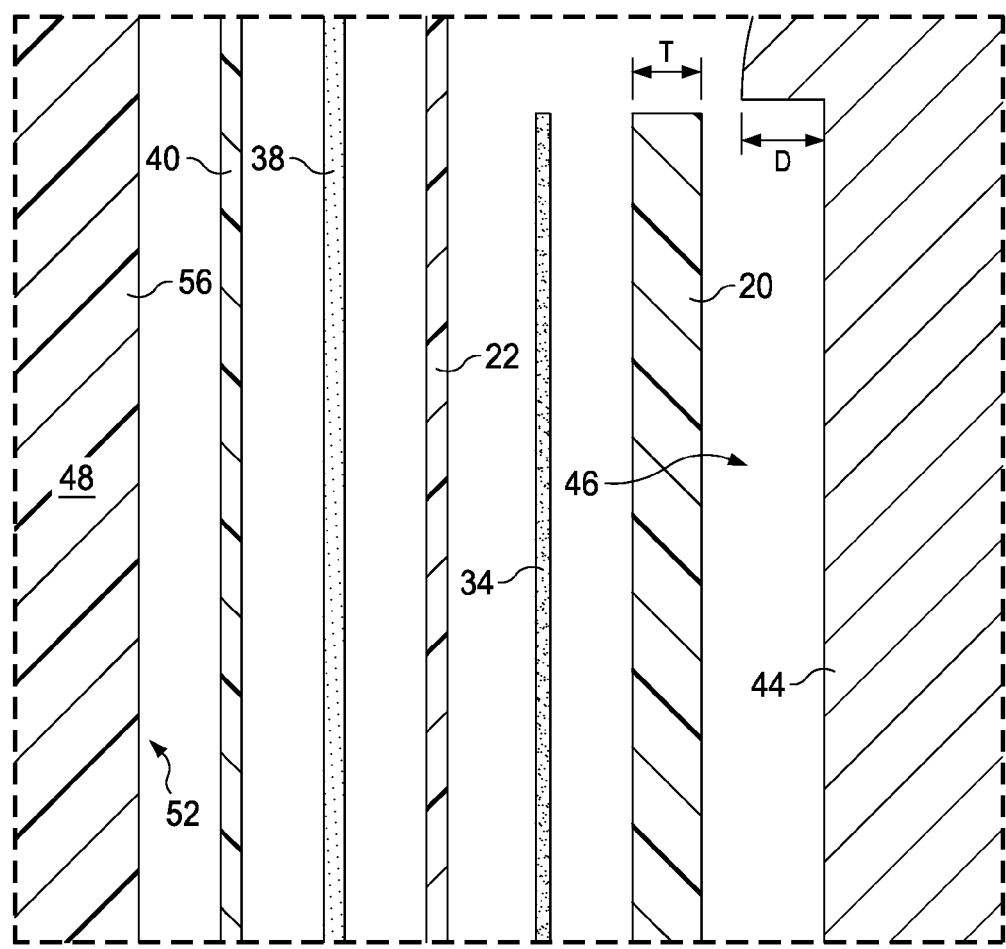
FIG. 9 is an illustration of the area designated as "FIG. 9" in FIG. 6, but exploded to show the individual layers.
Figure 10:
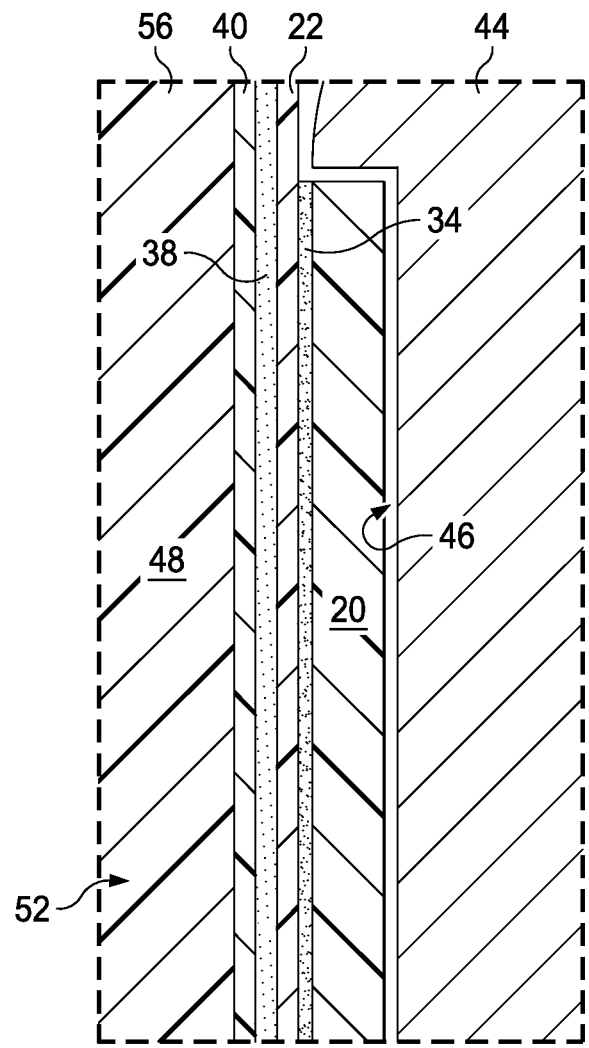
FIG. 10 is an illustration similar to FIG. 9, but showing the vacuum bag and the batten having been drawn down against the composite laminate structure.

Referring to FIG. 9, generally, the depth "D" of the pockets 46 is equal to or slightly greater than the battens 20 so that the battens 20 are fully recessed within the pockets 46, but yet may come into contact with the vacuum bag 22 when the stringer charge 48 and the tool 44 are assembled together. The assembly procedure of the battens 20 and the tools 44 may begin with applying the adhesive layer 34, such as double-sided adhesive tape on the battens 20, and then placing the battens 20 in the pockets 46 of the tools 44 indexed to the indexing pins 62. Air is drawn through the perforations 60 in the interior wall 55 by the vacuum source, creating a vacuum suction force that holds the battens 20 on the tools 44 during the assembly process that follows.

The vacuum bag assembly 45 is assembled around the stringer charge 48, and the bagged stringer charge 48 along with the vacuum bag assembly 45 are assembled with the tools 44. During this assembly process, the vacuum applied to the battens 20 hold the battens 20 within the pockets 46. After the tools 44 and the stringer charge 48 have been assembled, the vacuum holding the battens 20 in the pockets 46 is removed, thereby releasing the battens 20 from the tools 44. Assembly of the tools 44 with the stringer charge 48 brings the adhesive layer 34 on the battens 20 into contact with the vacuum bag 22, thereby adhering the battens 20 in flush, face-to-face contact with the vacuum bag 22.

As the vacuum bag 22 is evacuated during the compaction and cure process, the volume of the stringer 48 shrinks, and the bag 22 is drawn away from the tools 44 as a result of the stringer shrinkage. The battens 20 remain adhered to the vacuum bag 22 and are drawn away from the pockets 46 along with the vacuum bag 22 as the vacuum bag moves inwardly away from the tool 44 (see FIG. 10). As the vacuum bag 22 deforms, the adhesion between the battens 20 and the vacuum bag maintain and holds the vacuum bag 22 flush and flat against the battens 20, thereby preventing bag wrinkling in the area of the stringer web 52.

Figure 11:
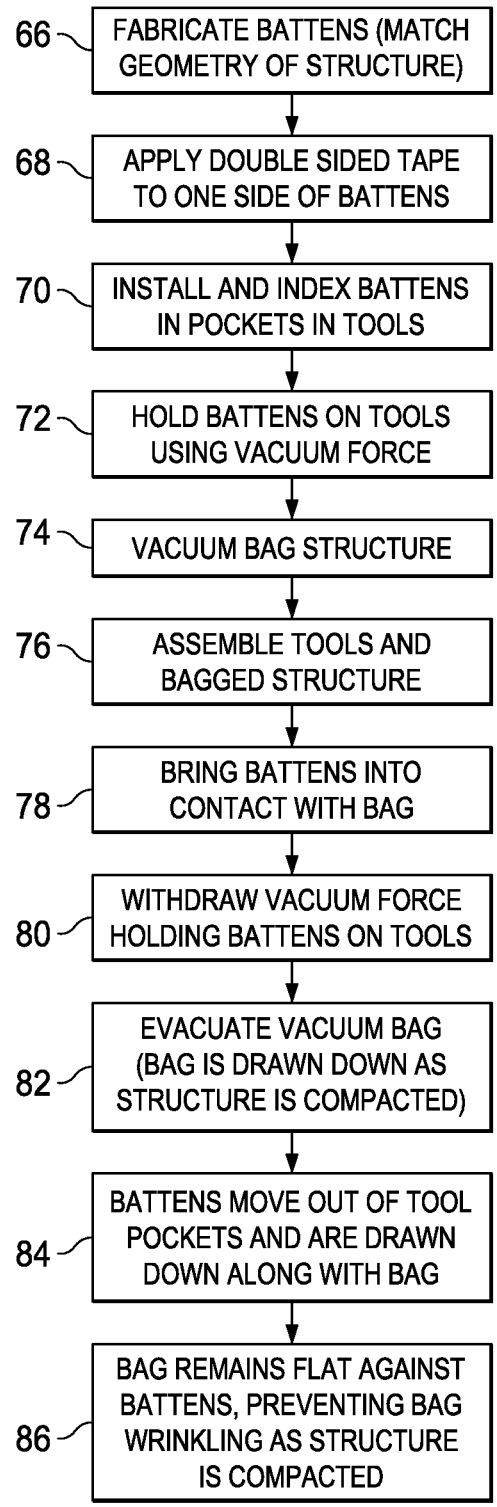
FIG. 11 is an illustration of a flow diagram of a method of vacuum bag processing a composite laminate structure.

FIG. 11 broadly illustrates the overall steps of a method of vacuum bag compaction of a composite laminate structure 24 that reduces or eliminates wrinkling of the bag during compaction of the structure 24. At 66, battens 20 suitable for the application are fabricated which match the geometry of one or more features of the composite laminate structure 24 where mark-off is to be avoided due to bag wrinkling. At 68, an adhesive layer 34 such as double-sided adhesive tape is applied to one side of each of the battens 20. At 70, the battens 20 are indexed and installed in pockets 46 within tools 44 used to locate and hold the composite laminate structure 24. At 72, the battens 20 are held on the tools using a vacuum force. Next, at 74, the composite laminate structure is vacuum bagged, following which, the vacuum bag structure 24 is assembled with the tools 44. At 78, the battens 20 are brought into contact with the vacuum bag 22, thereby adhering the battens 20 to the outer face 22a of the vacuum bag 22.

At 80, the vacuum force holding the battens 20 on the tools 44 is released, following which, at 82, the vacuum bag 22 is evacuated, causing the bag to be drawn down onto the composite laminate structure 24 and apply a compaction force which compacts the composite laminate structure 24. As the volume of the composite laminate structure 24 compacts and shrinks, the battens 20 move away from the tools 44 and are drawn down along with the vacuum bag 22. As shown at 86, the vacuum bag 22 remains flat against the battens 20 to prevent wrinkling of the bag as a composite laminate structure 24 is being compacted.

Figure 12:
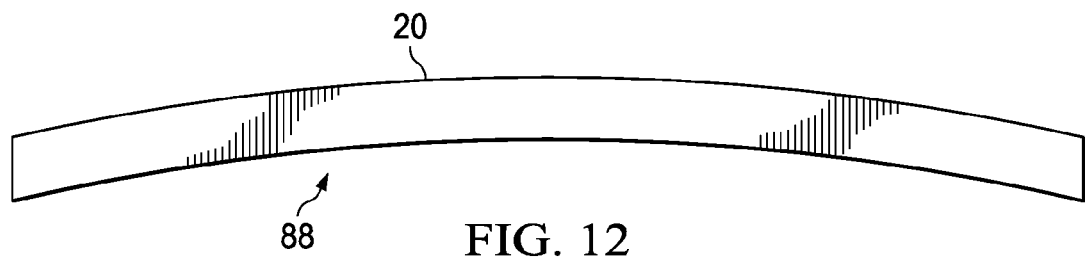
FIG. 12 is an illustration of an alternate embodiment of the batten having a curvature along its length.
Figure 13:
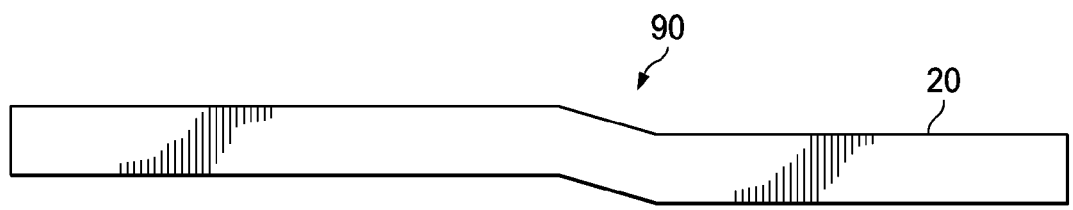
FIG. 13 is an illustration of another embodiment of the batten having a jog along its length.

In the embodiments previously discussed, the batten 20 has a substantially planar face 20a (FIG. 2) along its length. However, as already mentioned, the battens 20 may be configured to substantially match the geometry of features of a composite laminate structure where bag wrinkling and resulting mark-off are to be avoided. For example, referring to FIG. 12, the batten 20 may be curved along its length to substantially match, for example and without limitation, a contoured stringer web (not shown). Similarly, as shown in FIG. 13, the batten 20 may have one or more bends, steps or joggles 90 along its length to match corresponding features of the composite laminate structure 24 being vacuum compacted.

Figure 14:
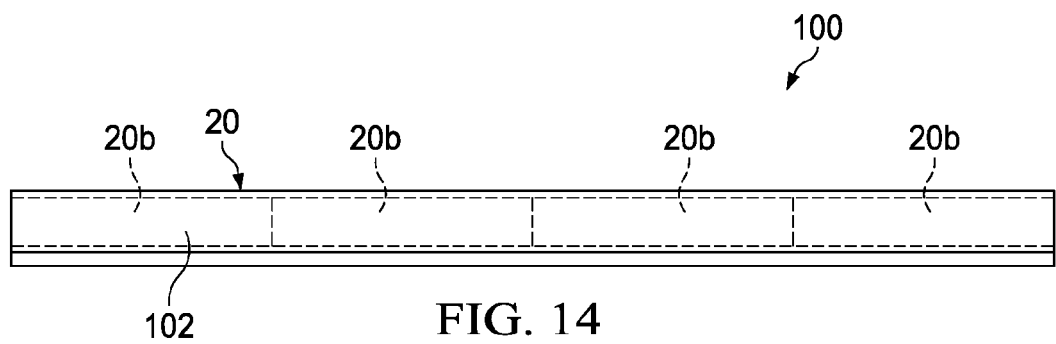
FIG. 14 is an illustration of batten sections arranged end-to-end to cover the length of a composite laminate stringer.

In some cases where the composite laminate structure is particularly long, the batten 20 may be assembled in a plurality of sections. For example referring to FIG. 14, a long stringer 100 includes a web or blade 102. A plurality of batten sections 20b are assembled end-to-end along the web 102 in order to prevent bag wrinkling in the area of the web 102 throughout its entire length.

Figure 15:
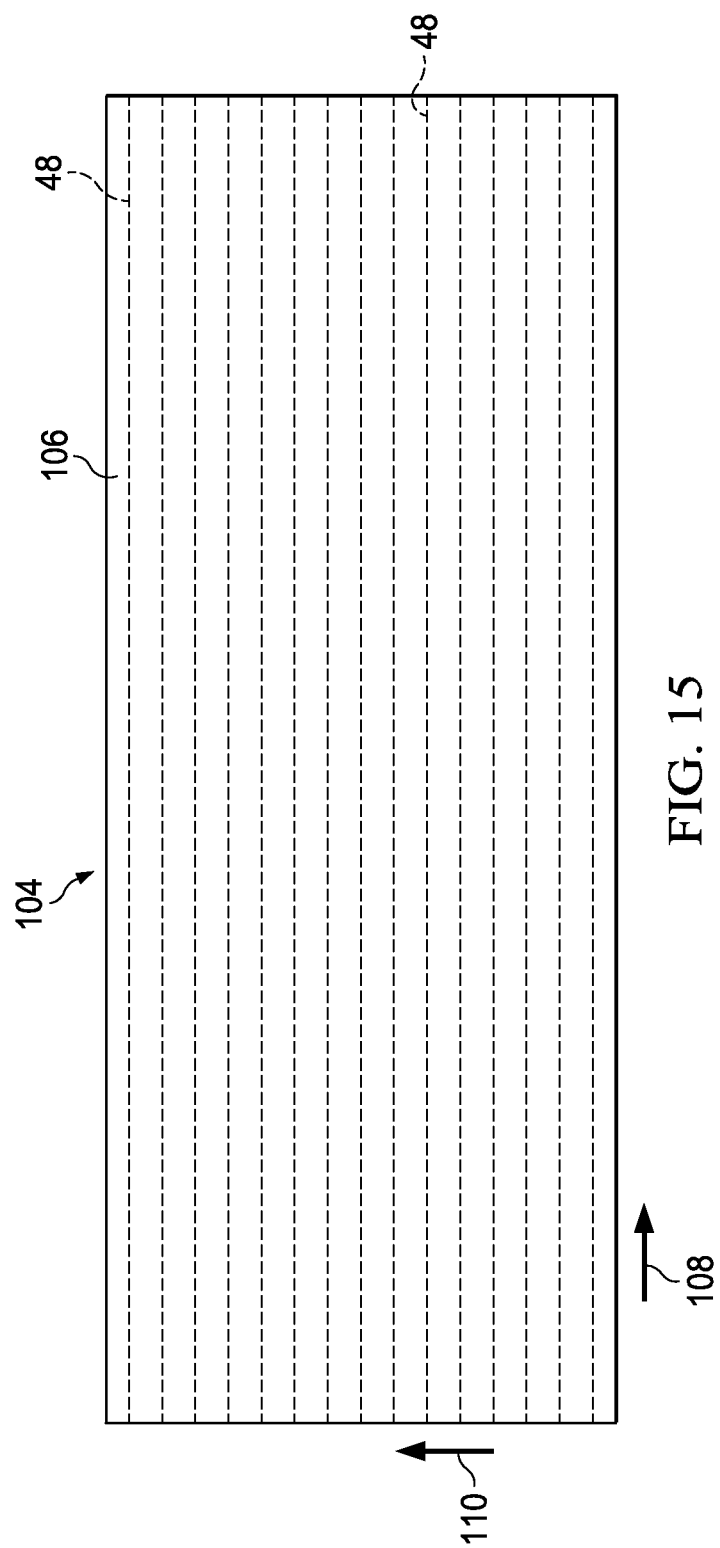
FIG. 15 is an illustration of a plan view of an integrally stiffened panel.

The disclosed battens 20 for preventing vacuum bag wrinkling and attendant mark-off may be used in a variety of aircraft applications to fabricate various components and subassemblies. For example, referring to FIG. 15, the disclosed battens 20 may be employed in connection with the fabrication of integrally stiffened panels 104 comprising a composite skin 106 integrally stiffened by a plurality of stringers 48. The stringers may extend in a longitudinal direction 108 of the integrally stiffened panel 104, and may be longitudinally spaced apart in a transverse direction 110. The stringers 48 may be co-cured with, or bonded to the composite skin 106.

Figure 16:
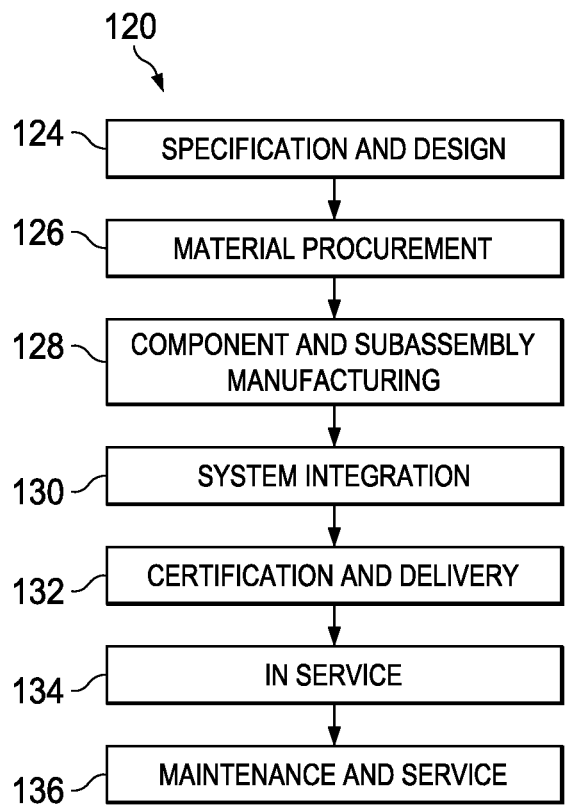
FIG. 16 is an illustration of a flow diagram of aircraft production and service methodology.
Figure 17:
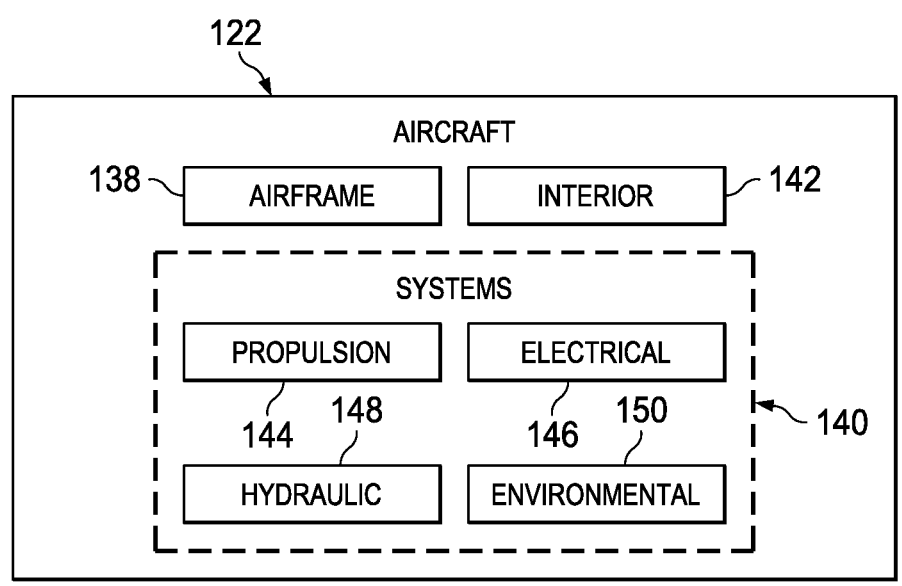
FIG. 17 is an illustration of a block diagram of an aircraft.

Embodiments of the disclosure may find use in a variety of potential applications, particularly in the transportation industry, including for example, aerospace, marine, automotive applications and other application where the composite laminate structures, such as stringers, spars and beams to name only a few, may be used. Thus, referring now to FIGS. 16 and 17, embodiments of the disclosure may be used in the context of an aircraft manufacturing and service method 140 as shown in FIG. 16 and an aircraft 122 as shown in FIG. 17. Aircraft applications of the disclosed embodiments may include, for example, without limitation, a composite laminate structures, compliments or parts used in the aircraft 122, or the maintenance thereof. During pre-production, exemplary method 120 may include specification and design 124 of the aircraft 122 and material procurement 126. During production, component and subassembly manufacturing 128 and system integration 130 of the aircraft 122 takes place. Thereafter, the aircraft 122 may go through certification and delivery 132 in order to be placed in service 134. While in service by a customer, the aircraft 122 is scheduled for routine maintenance and service 136, which may also include modification, reconfiguration, refurbishment, and so on.

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 122 produced by exemplary method 120 may include an airframe 138 with a plurality of systems 140 and an interior 142. Examples of high-level systems 140 include one or more of a propulsion system 144, an electrical system 146, a hydraulic system 148 and an environmental system 150. Any number of other systems may be included. Although an aerospace example is shown, the principles of the disclosure may be applied to other industries, such as the marine and automotive industries.

Systems and methods embodied herein may be employed during any one or more of the stages of the production and service method 120. For example, components or subassemblies corresponding to production process 128 may be fabricated or manufactured in a manner similar to components or subassemblies produced while the aircraft 122 is in service. Also, one or more apparatus embodiments, method embodiments, or a combination thereof may be utilized during the production stages 128 and 130, for example, by substantially expediting assembly of or reducing the cost of an aircraft 122. Similarly, one or more of apparatus embodiments, method embodiments, or a combination thereof may be utilized while the aircraft 122 is in service, for example and without limitation, to maintenance and service 136.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of vacuum bag processing a composite laminate structure, comprising:
    placing a vacuum bag over the composite laminate structure;
    attaching a batten to an outer face of the vacuum bag over a portion of the composite laminate structure, wherein the batten is substantially rigid and wherein attaching the batten includes placing an adhesive layer between the batten and the outer face of the vacuum bag; and
    compacting the composite laminate structure by evacuating the vacuum bag.

2. The method of claim 1, wherein placing the adhesive layer includes placing a layer of double-sided adhesive tape between the batten and the outer face of the bag.

3. The method of claim 1, further including:
    installing the batten on a tool, and
    wherein attaching the batten includes bringing the tool into contact with the outer face of the vacuum bag.

4. The method of claim 3, wherein installing the batten on the tool includes indexing the batten on the tool to a location aligned with a feature of the composite laminate structure.

5. The method of claim 3, wherein installing the batten includes holding the batten against the tool using a suction force.

6. A method of reducing wrinkling of a vacuum bag during vacuum bag compaction of a composite laminate structure, comprising:
    attaching a batten to an external face of the vacuum bag at a location on the vacuum bag covering a feature of the composite laminate structure, wherein the batten is generally rigid and wherein attaching the batten includes applying an adhesive layer between the external face of the vacuum bag and one side of the batten.

7. The method of claim 6, wherein attaching the batten includes applying the adhesive layer to the batten, and bringing the batten into contact with the vacuum bag.

8. The method of claim 6, wherein attaching the batten includes aligning the batten with a feature of the composite laminate structure.

9. The method of claim 6, wherein attaching the batten includes:
    installing the batten on a tool, and
    bringing the tool into contact with the vacuum bag.

10. A method of fabricating a composite laminate structure, comprising:
    assembling a composite laminate layup;
    installing a vacuum bag over the composite laminate layup;
    attaching a batten on an external face of the vacuum bag covering a feature of the composite laminate layup, including adhering the batten in face-to-face contact with the external face of the vacuum bag;
    evacuating the vacuum bag;
    using the batten to substantially prevent wrinkling of the vacuum bag covering the feature; and
    curing the composite laminate layup.

11. The method of claim 10, wherein attaching the batten includes:
    installing the batten on a tool, and
    bringing the tool into contact with the vacuum bag.

12. An apparatus for curing a composite laminate structure, comprising:
    at least one tool capable of having a composite laminate layup placed thereagainst, the tool including at least one pocket therein facing a feature of the composite laminate layup;
    a vacuum bag sealed over the composite laminate layup; and
    at least one batten capable of being received within the pocket and engaging an external face of the vacuum bag, wherein the at least one batten is substantially rigid.

13. The apparatus of claim 12, wherein the tool includes an indexing device for indexing the batten in a preselected positioned within the pocket.

14. The apparatus of claim 12, wherein the tool includes:
- a wall within the pocket against which the batten may be held, and
- a plurality of perforations in the wall adapted to be coupled with a vacuum for creating a suction force holding the batten against the wall.

15. The apparatus of claim 12, wherein the batten is a cured, multi-ply composite laminate having a face substantially matching the feature of the composite laminate layup.

16. An apparatus for reducing wrinkling of a vacuum bag during vacuum bag compaction of a composite laminate, comprising:
- a batten having a geometry substantially matching a feature of the composite laminate, wherein the batten is substantially rigid; and
- an adhesive layer attaching the batten to the vacuum bag.

17. The apparatus of claim 16, wherein the adhesive layer is double-sided adhesive tape covering one side of the batten.

18. The method of claim 1, wherein the batten comprises a plurality of sections and further comprising:
- assembling the plurality of sections to form the batten.

19. The method of claim 6, wherein the composite laminate structure comprises a stringer.

* * * * *

UNITED STATES PATENT AND TRADEMARK OFFICE
CERTIFICATE OF CORRECTION

PATENT NO. : 9,511,520 B1  
APPLICATION NO. : 14/463753  
DATED : December 6, 2016  
INVENTOR(S) : Encinosa et al.

Page 1 of 1

It is certified that error appears in the above-identified patent and that said Letters Patent is hereby corrected as shown below:

In the Claims

Column 9, Line 3, change "positioned" to -- position --

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*